United States Patent
Musisi-Nkambwe et al.

(10) Patent No.: US 9,906,249 B2
(45) Date of Patent: Feb. 27, 2018

(54) METHOD AND APPARATUS FOR COMPENSATING FOR A LOSS OF LOW-FREQUENCY SIGNAL CONTENT OF AN INPUT SIGNAL AT A RECEIVER INPUT

(71) Applicants: Mirembe A. Musisi-Nkambwe, Chandler, AZ (US); Martin J. Bayer, Gilbert, AZ (US); Jeffrey A. Porter, Gilbert, AZ (US)

(72) Inventors: Mirembe A. Musisi-Nkambwe, Chandler, AZ (US); Martin J. Bayer, Gilbert, AZ (US); Jeffrey A. Porter, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/572,778

(22) Filed: Dec. 17, 2014

(65) Prior Publication Data

US 2016/0182107 A1    Jun. 23, 2016

(51) Int. Cl.
| H03D 1/24 | (2006.01) |
| H04B 1/16 | (2006.01) |
| H04L 12/26 | (2006.01) |
| H04L 25/10 | (2006.01) |

(52) U.S. Cl.
CPC .............. *H04B 1/16* (2013.01); *H04L 25/10* (2013.01); *H04L 43/16* (2013.01)

(58) Field of Classification Search
CPC .................. H04L 27/06; H04L 27/38
See application file for complete search history.

(56) References Cited

U.S. PATENT DOCUMENTS

| 3,714,590 A * | 1/1973 | Freeman ................... G06J 1/00 327/355 |
| 7,218,687 B2 * | 5/2007 | Huang .................. H04L 25/061 327/307 |
| 7,720,141 B2 | 5/2010 | Fang et al. |
| 7,961,817 B2 | 6/2011 | Dong et al. |
| 8,594,172 B2 | 11/2013 | Zhong |
| 2008/0063091 A1 | 3/2008 | Dong et al. |

(Continued)

OTHER PUBLICATIONS

Zhong, F. et al., "A 1.0625 ~ 14.025 Gb/s Multi-Media Transceiver With Full-Rate Source-Series-Terminated Transmit Driver and Floating-Tap Decision-Feedback Equalizer in 40 nm CMOS", IEEE Journal of Solid-State Circuits vol. 46, Issue 12, Dec. 2011, pp. 3126-3139.

*Primary Examiner* — Chieh M Fan
*Assistant Examiner* — Gina McKie (57) ABSTRACT

A compensation circuit is configured to compensate for a loss of low-frequency signal content of an input signal at a receiver input. The compensation circuit includes a switching circuit and a summing circuit coupled to the switching circuit. The switching circuit is configured to receive a first plurality of digitized values sampled from a receiver output signal. The summing circuit is configured to generate a summation signal based on a combination of a first plurality of input values selected by the switching circuit. The selecting is based on the first plurality of digitized values. The compensation circuit is configured to provide to the receiver input a compensation signal to compensate for the loss of the low-frequency signal content from the input signal. The compensation signal is based on the summation signal and is a function of at least one gain value.

19 Claims, 8 Drawing Sheets

(56) References Cited

U.S. PATENT DOCUMENTS

| | | | |
|---|---|---|---|
| 2009/0226015 A1* | 9/2009 | Zeng | H04R 25/353 |
| | | | 381/316 |
| 2010/0109768 A1* | 5/2010 | Kotowski | H03F 3/217 |
| | | | 330/10 |
| 2010/0235673 A1* | 9/2010 | Abbasfar | H03M 7/20 |
| | | | 713/500 |
| 2012/0019946 A1* | 1/2012 | Aravind | G11B 20/10037 |
| | | | 360/39 |
| 2012/0155528 A1 | 6/2012 | Zhong | |
| 2012/0313701 A1* | 12/2012 | Khlat | H02M 3/07 |
| | | | 330/127 |
| 2014/0023134 A1 | 1/2014 | Zhong | |
| 2014/0062622 A1* | 3/2014 | Hidaka | H04B 3/143 |
| | | | 333/28 R |
| 2015/0253993 A1* | 9/2015 | Miyoshi | G05B 15/02 |
| | | | 710/5 |

* cited by examiner

METHOD AND APPARATUS FOR COMPENSATING FOR A LOSS OF LOW-FREQUENCY SIGNAL CONTENT OF AN INPUT SIGNAL AT A RECEIVER INPUT

FIELD

The present disclosure relates generally to compensation circuits and more particularly to a method and apparatus for compensating for a loss of low-frequency signal content of an input signal at a receiver input.

BACKGROUND

Communication systems for business and personal use that transmit data at very high rates of speed are desirable. Data can be serially transmitted as a bit stream, which is a sequence of bits, e.g., logic level 1s and 0s, or as a stream of other symbols, e.g., multilevel pulse amplitude modulation (PAM), to represent information to be communicated. In these systems, a receiver extracts the transmitted data by accurately decoding the bit stream. Capacitive coupling and high pass filtering aide in accurate decoding by blocking undesirable low-frequency signals, including direct current (DC) signals, for instance noise on a transmission line. For accurate decoding, the high or low voltage levels associated with bits in the bit stream should generally stay the same.

However, in some circumstances, for example when the data contains multiple 0s or multiple 1s over a time period that approaches or exceeds the RC time constant of the high pass filter, low-frequency signal content, also referred to herein as low-frequency components, of the input signal are filtered and lost from the signal prior to providing the signal to the receiver input. This loss of low-frequency content causes a distortion of the high frequency content of the input signal due at least in part to an imbalance of charge on the coupling capacitor, such that the voltage values associated with either high or low voltage signals vary. This variation, sometimes referred to as baseline wander, adversely affects data recovery and increases bit error rates.

Some conventional approaches compensate for baseline wander using circuitry, such as gathering multiple bits to provide a composite signal, which adds latency. Other conventional approaches compensate for baseline wander using circuitry that operates on the signal coming directly from the receiver. Using the receiver output signal proves difficult under some circumstances because the signal can contain distortion, such as pulse width distortion, hence the correction signal is tightly coupled to the duty cycle of the input data. Additionally, the circuitry that uses the receiver output signal operates at the rate of the input data, which make the solution impractical as data rates of communicated signals continue to increase.

BRIEF DESCRIPTION OF THE DRAWINGS

In the accompanying figures, like reference numerals refer to identical or functionally similar elements throughout the separate views. The figures together with the detailed description below are incorporated in and form part of the specification. Moreover, the figures and the detailed description serve to further illustrate embodiments of concepts that include the claimed embodiments and explain various principles and advantages of those embodiments.

Embodiments of the present disclosure are illustrated by way of example and are not limited by the accompanying figures. Elements in the figures are illustrated for simplicity and clarity and have not necessarily been drawn to scale. For example, the dimensions of some elements in the figures may be exaggerated relative to other elements to help to improve understanding of the embodiments.

The apparatus and method components have been represented where appropriate by conventional symbols in the drawings. Some drawings show only those specific details that are pertinent to understanding the embodiments, so as not to obscure the disclosure with details that will be readily apparent to those of ordinary skill in the art having the benefit of the description herein. Also, the functions included in the flow diagrams do not imply a required order of performing the functionality contained therein.

DETAILED DESCRIPTION

In accordance with embodiments are compensation circuits configured to compensate for a loss of low-frequency signal content of an input signal at a receiver input. The compensation circuits provide a filtered feedback signal to the receiver input that can be used in baseline wander correction or compensation, where a filter formed by a coupling capacitor and impedance has removed low-frequency components from the input signal. The compensation circuits include a summing circuit that receives input values that are selected by a switching circuit using multiple digitized values, for instance from a multi-phase sampler circuit that samples the input signal. The summing circuit generates a summation signal, e.g., a moving average, based on the selected input values. The compensation circuit generates the filtered feedback signal using the summation signal and at least one gain value.

For a particular embodiment, the digitized values are used to switch in one or multiple gain values that are averaged by the summing circuit to generate the filtered feedback signal. For an alternative embodiment, the digitized values are used to switch in a plurality of reference values that are averaged by the summing circuit. This average is provided to a compensation enablement circuit to determine, whether to disable the feedback or to select one of multiple full amplitude gain values to provide as the filtered feedback signal to the receiver input.

Using the digitized values from the sampler circuit, as opposed to using the receiver output, can minimize or eliminate the effect of pulse width distortion when generating the filtered feedback signal. Using multiple, e.g., N, de-multiplexed digitized values from the sampler to feed the switching circuit allows the switching circuit to operate at a frequency of f/N, where f is the frequency of the input signal. Such operation is scalable for very high frequency circuits, such as those processing signals approaching frequencies of 30 Gigabits per second (Gbps) or more. Generating the filtered feedback signal using a moving average of the input values minimizes feedback latency by eliminating the need for accumulation circuitry and look-up tables.

Figure 1:
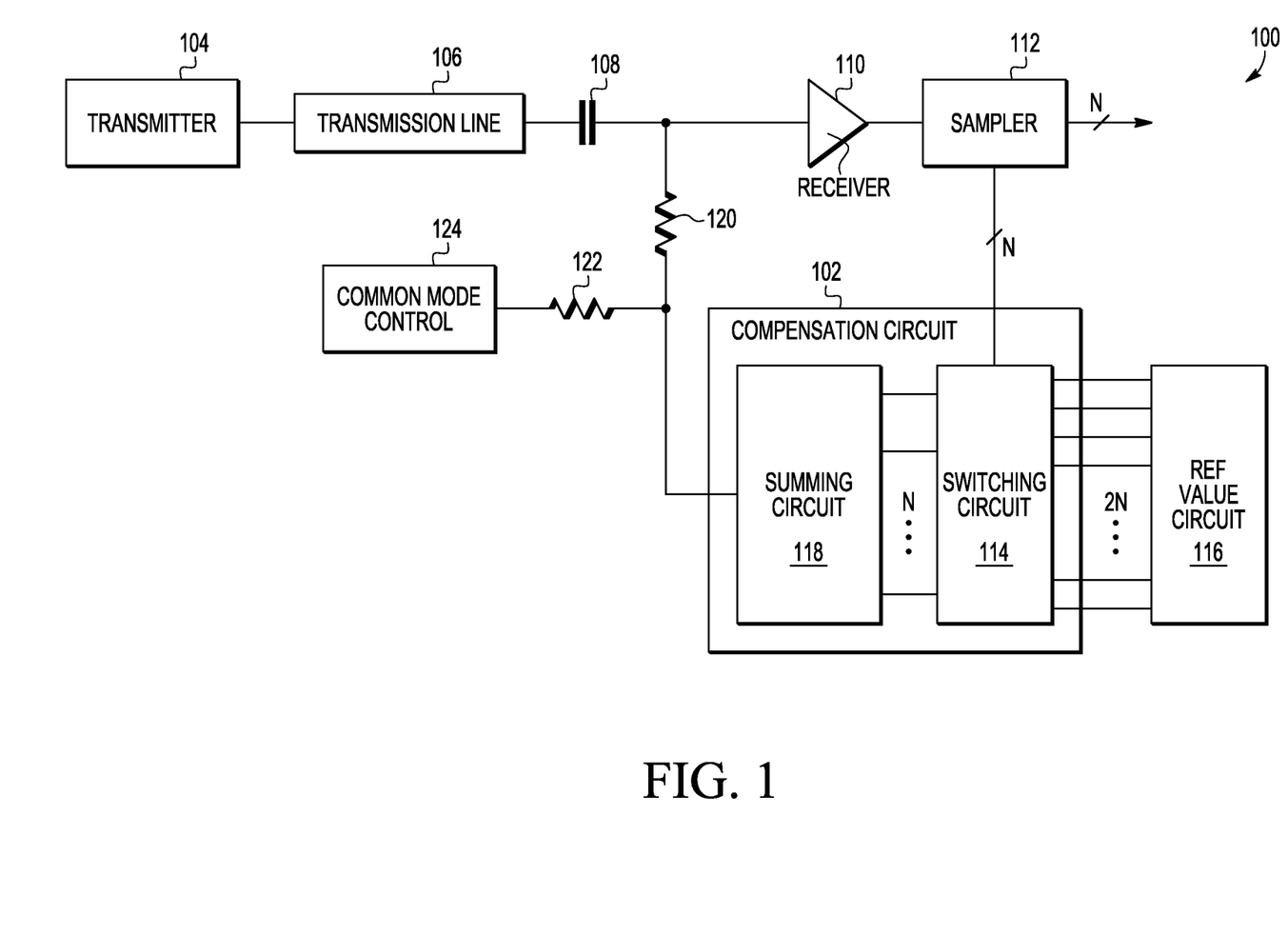
FIG. 1 illustrates a system having a compensation circuit for compensating for the loss of low-frequency signal content, in accordance with an embodiment.

FIG. 1 illustrates a system 100 showing a general structure for a compensation circuit 102 for compensating for the loss of low-frequency signal content, in accordance with an embodiment. The system includes a transmitter 104, a transmission line 106, a coupling capacitor 108, a receiver 110, a sampler circuit (also referred to as a sampler) 112, the compensation circuit 102, a reference value circuit 116, a common mode control 124, and resistor networks 120 and 122. For one example implementation scenario, the transmitter 104 of one device serially communicates with the receiver 110 of a separate device, such as a peripheral device, over the transmission line 106, such as a serial cable. However, the disclosed embodiments can be used in a system 100 that connects two separate sub-systems within one device through a coupling capacitor, such as where a data bus or wire connects a sub-system on one integrated circuit (IC) having the transmitter 104 with a sub-system on another IC having the receiver 110, within the same device. For another example, the input signal is transmitted at a data rate or frequency of 28 Gbps.

The transmitter 104 is configured to send data as a bit stream, e.g., a sequence of 1s and 0s, or as a stream of other symbols, e.g., multilevel pulse amplitude modulation (PAM), to represent information to be communicated. The bit stream is sent over the transmission line 106 as an input signal for the receiver 110. The transmission line 106 can be a line or wire between two sub-systems of the same device, or the transmission line 106 can be a cable that carries serial data between two devices.

The capacitor 108 and resistor network 120 operate as a high pass filter to pass, to an input of the receiver 110, high-frequency alternating current (AC) signal content of the input signal while blocking low-frequency signal content of the input signal. For example, the high pass filter passes the high-frequency content of the input signal, and attenuates or blocks low frequencies from the transmission line 106. In an embodiment, both resistor networks 120 and 122 include a single resistor. However, either or both resistor networks 120, 122 (and other resistor networks shown in the various embodiments as single resistors) can include multiple resistors combined in a manner to provide the desired resistance values for the resistor networks.

As used herein, high-frequency signal content is that part of a signal that has a frequency that is higher than the cutoff frequency of a filter, such that the signal is allowed through by a high pass filter and blocked or attenuated by a low pass filter. Conversely, low-frequency signal content is that part of a signal that has a frequency that is lower than the cutoff frequency of a filter, such that the signal is allowed through by a low pass filter and blocked or attenuated by a high pass filter.

The receiver 110 operates using a DC common mode input voltage as a bias point, which is controlled and set using the common mode control 124 and a voltage divider that includes resistor networks 120 and 122. The AC signal out of the capacitor 108 is coupled or added onto the DC common mode signal and provided to the receiver 110 for amplification. The amplified signal is sampled and de-multiplexed by the sampler 112 to provide, e.g., on separate output lines, N number of parallel digital output signals that each includes a sequence of digitized values, for instance bits. For one embodiment, the sampler 112 performs a 1-to-N de-multiplexing, and the receiver output signal rate is reduced by a factor of N or N bits to reduce the frequency, f, or data rate of the receiver output signal to f/N for each parallel stream out of the sampler 112.

Accordingly, the sampler 112 provides N digitized values (also referred to herein as a first plurality of digitized values) at a rate of f/N. For a further embodiment, the sampler 112 is configured to provide the first plurality of digitized values at multiple phases, meaning that the parallel streams are generated using different clock edges or multiple clocks at different phases. Accordingly, the output for each parallel stream switches to the next bit at a different time. For an alternate embodiment, the sampler 112 provides the plurality of digitized values on the same clock edge such that the parallel streams are in-phase or have the same phase. In this case, the output for each parallel stream switches to the next bit at substantially the same time. The N digitized values are provided to other circuitry (not shown) for further processing to eventually generate an output that can be interfaced to a user.

Some instances of data within the input signal may include low-frequency signal content that is undesirably blocked or attenuated using the high pass filter of the capacitor 108 and the resistor network 120. For example, the input signal can introduce low-frequency signal content where the transmitted signal contains a string of 1s or a string of 0s over a long enough period of time, for instance longer than the RC time constant of the high pass filter, which is the product of the capacitance value of the capacitor 108 and the resistance value of the resistor 120. For another example, portions of the transmitted data stream that fluctuate between the number of 1s and 0s may include an imbalance of 1s and 0s over a long period of time, thereby introducing a non-zero low-frequency, e.g., DC, component into the transmitted signal.

When this occurs, the high pass filter introduces a decay into the signal at the input of the receiver 110 (baseline wander) due to the loss of the low-frequency components of the transmitted signal and a resulting imbalance on the charge of the plates of the capacitor 108. This decay can cause the baseline magnitude of the input signal to be shifted relative to the decision thresholds at the receiver 110 interface which can increase the bit-error rate of the received data.

Accordingly, the disclosed system embodiments, for instance as illustrated in FIGS. 1, 3, 5, and 6, include the compensation circuit 102 coupled as a feedback circuit between the sampler 112 and the input of the receiver 110. Particularly, the compensation circuit 102 includes a switching circuit 114 and a summing circuit 118. The switching circuit 114 is coupled to the sampler 112 and to the reference value circuit 116. The summing circuit 118 is coupled between the switching circuit 114 and the input of the receiver 110.

Figure 2:
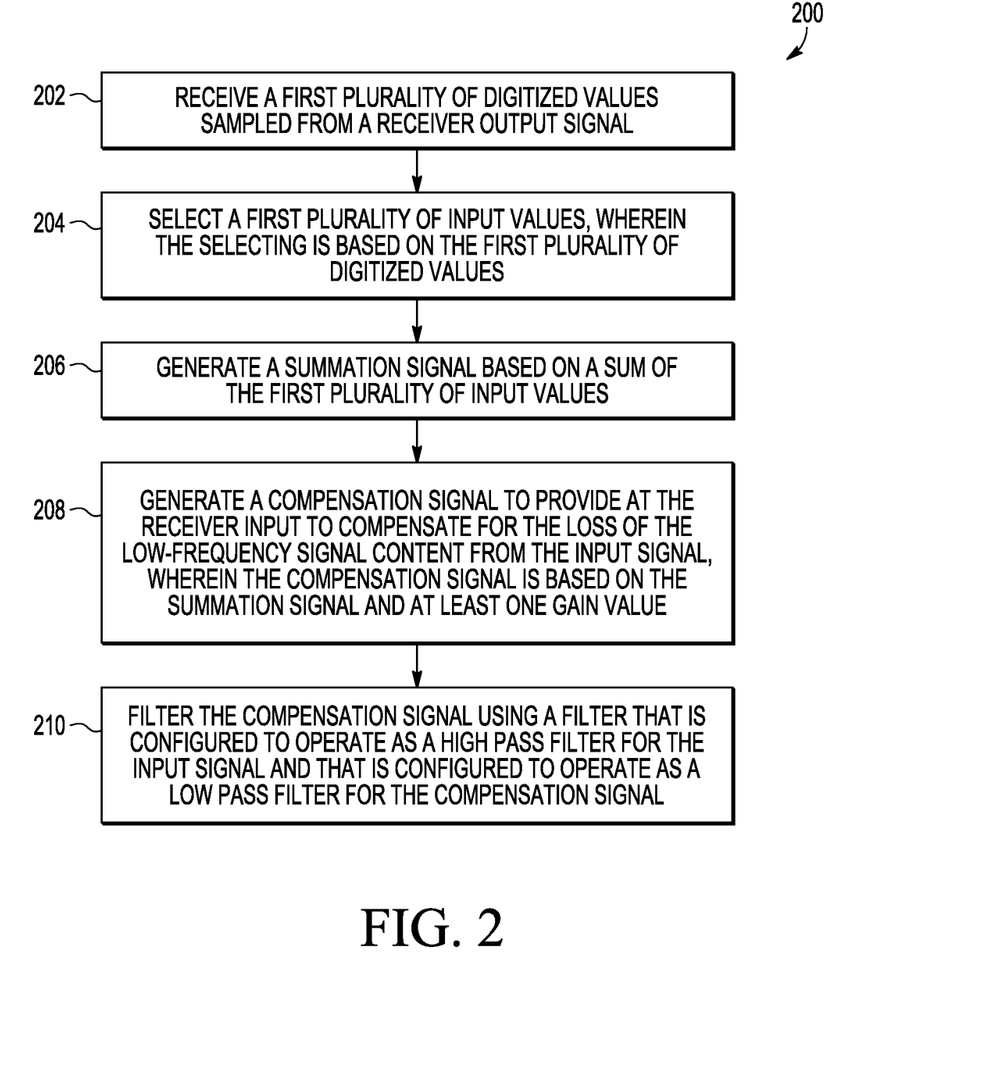
FIG. 2 illustrates a flow diagram for compensating for a loss of low-frequency signal content according to an embodiment.

FIG. 2 illustrates a flow diagram of a general method 200 for compensating for a loss of low-frequency signal content according to an embodiment. For example, the method 200 is performed by the compensation circuit 102 of FIG. 1 to compensate for the low-frequency signal content of the input signal (also referred to interchangeably herein as the transmitted signal) that is removed or blocked by the coupling capacitor 108. The method includes the switching circuit 114, at block 202, receiving a first plurality of N digitized values that were sampled from the output signal of the receiver 110.

The method further includes, at block 204, the switching circuit 114 selecting a first plurality of input values provided by the reference value circuit 116, which the switching circuit 114 then provides to the summing circuit 118. The selecting is based on the first plurality of N digitized values. In other words, the selecting is performed using or under the control of the first plurality of N digitized values. The type and number of input values selected depend on the particular implementation.

For an example regarding the type of input values selected, as illustrated by reference to FIG. 3, the plurality of input values can include a plurality of gain values. A gain value, as used herein, corresponds to a magnitude of the input signal for a given digitized value and can be represented, for instance, as a voltage or a current. However, other types of input values can be implemented based on the particular embodiment, including the embodiments illustrated in FIGS. 5 and 6.

The physical implementation of system 100 provides an example regarding the number of input values selected based on the first plurality of N digitized values. Particularly, as shown, for each number of N connections for receiving N digitized values, the switching circuit 114 has 2N connections to the reference value circuit 116 for selecting input values, for instance from 2N output lines. Also, the number of connections into the summing circuit 118 for receiving the plurality of selected input values is the same as the number, N, of digitized values in the plurality of digitized values that the sampler 112 provides to the switching circuit 114.

In one example implementation, there are N sets of two connections between the switching circuit 114 and the reference value circuit 116. Accordingly, for each digitized value of the N digitized values that the switching circuit 114 receives, the switching circuit 114 selects between two reference values, e.g., a higher value and a lower value. In a further implementation, the switching circuit 114 selects the connection, of the two connections, to receive the higher reference value as an input value when the received digitized value is a 1. Conversely, the switching circuit 114 selects the connection, of the two connections, to receive the lower reference value as an input value when the received digitized value is a 0. However, the selection methodology could be reversed or could be any other suitable selection methodology.

As mentioned above, the sampler 112 can operate as a 1-to-4 de-multiplexer. For this embodiment and where the input signal, e.g., the transmitted signal and the signal input to the receiver 110, is characterized by a first frequency, f1, the selecting of the first plurality of input values, from the reference value circuit 116, is characterized by a second frequency of f1/N. Thus, for this embodiment, the switching circuit 114 receives the N digitized values from the sampler 112 at a rate of f1/N and, thereby, operates to select the corresponding plurality of input values from the reference value circuit 116 at the rate of f1/N. This makes the switching circuit 114 scalable for systems communicating data with very high data rates. For example, where the input signal has a frequency of 28 Gbps, and N=4, the switching circuit need only operate at a frequency of 7 Gbps.

At block 206, the method continues with the summing circuit 118 generating a summation signal based on a combination of the first plurality of input values provided by the switching circuit 114. The compensation circuit 102, at block 208, generates a compensation signal to provide at the receiver 110 input to compensate for the loss of the low-frequency signal content from the input signal. The compensation signal is based on the summation signal generated by the summing circuit 118 and at least one gain value.

Furthermore, where the compensation circuit 102 is connected to the receiver 110 input through the resistor network 120, for instance as shown in the FIGs., the filter that includes the capacitor 108 and the resistor 120 and that is configured to operate as a high pass filter for the input signal, is also configured to operate as a low pass filter for the compensation signal. Accordingly, method 200 further includes the system 100, at block 210, filtering the compensation signal using a filter that is also used to filter the input signal.

Exactly how that compensation circuit 102 operates to generate the compensation signal depends on the particular implementation of the compensation circuit 102. However, in general, the compensation signal that is provided to the input of the receiver 110 represents a filtered feedback signal. This filtered feedback signal and the low-frequency content that was removed have at least the following commonalities: a related data pattern by being generated using the N digitized values from the sampler 112; a related amplitude by being generated using the at least one gain value; and a similar RC time constant by being filtered using the same hardware as used to filter the input signal. Accordingly, this filtered feedback signal can replace at least some of the low-frequency content that was filtered out of the input signal and, thereby, add charge back to the capacitor 108 and compensate for the baseline wander.

Figure 3:
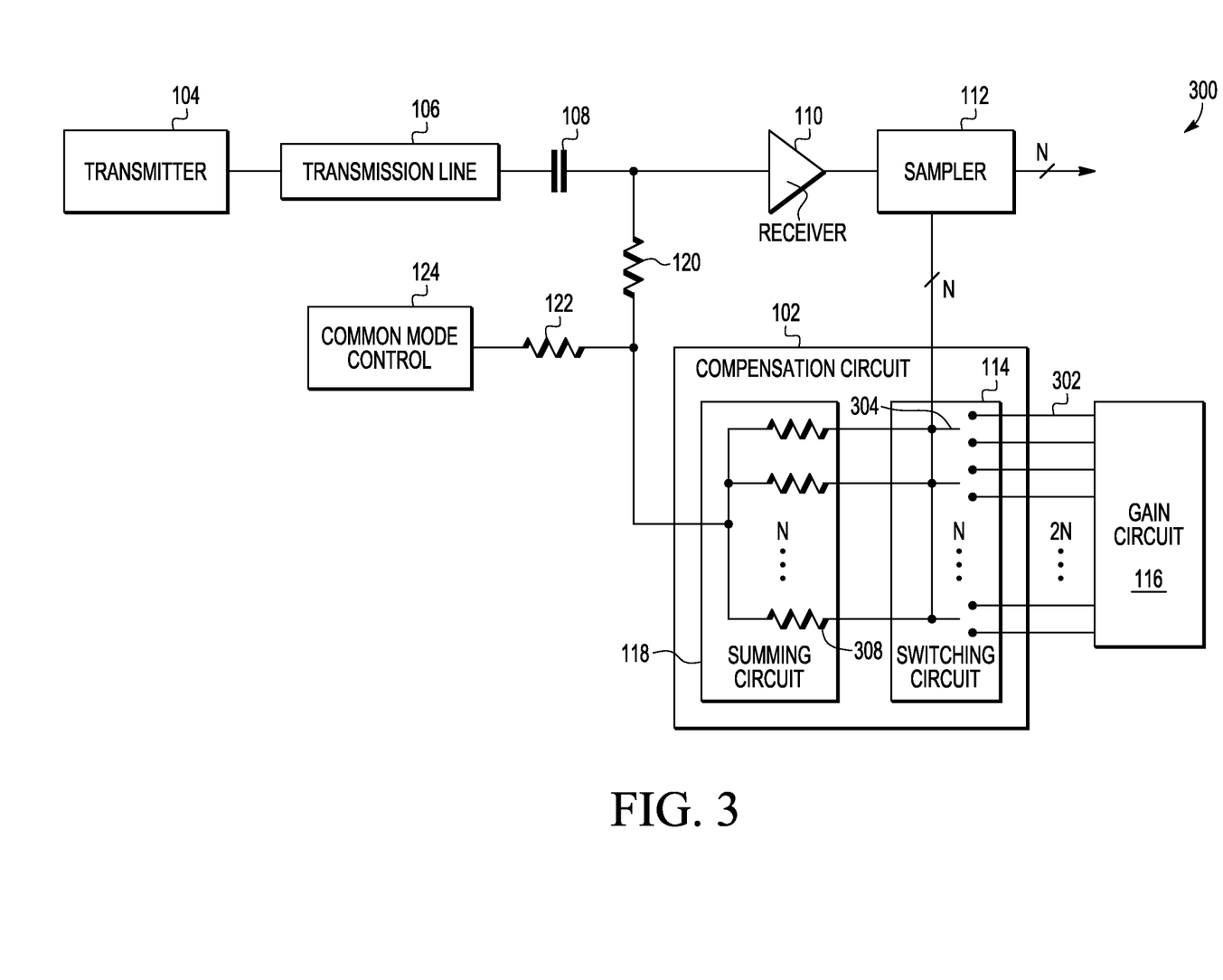
FIG. 3 illustrates a system having a compensation circuit for compensating for the loss of low-frequency signal content, in accordance with an embodiment.

FIG. 3 illustrates a system 300 having one example arrangement for the compensation circuit 102. The system 300 includes the transmitter 104, the transmission line 106, the capacitor 108, the receiver 110, the sampler 112, the compensation circuit 102, the reference value circuit 116, the common mode control 124 and the resistor networks 120 and 122 having a similar connectivity and operation as described by reference to FIGS. 1 and 2. However, FIG. 3 further illustrates a particular embodiment of the switching circuit 114 and the summing circuit 118. Moreover, in the system 300, the reference value circuit 116 is implemented as a gain circuit.

As shown, the gain circuit 116 has multiple, e.g. 2N, outputs 302 that provide a corresponding 2N gain values, for instance in the form of or representative of voltage or current magnitudes. For a particular embodiment, there are N sets of 2 outputs 302. Each set of two outputs alternatively provides: a high gain value representing or approximating a high signal value corresponding to a digitized value 1 sampled from the receiver 110 output signal; and a low gain value representing or approximating a low signal value corresponding to a digitized value 0 sampled from the receiver 110 output signal. For one example, the high gain value is the same for each set of 2 outputs 302, and the low gain value is the same for each set of 2 outputs 302. For a further example, the high and low gain values are determined and perhaps modified somewhat over time, in a manner that maximizes or fine tunes compensating for the loss frequency content from the input signal. The high and low gain values can be set using any suitable methodology, the details of which are well known and not included for the sake of brevity.

The switching circuit 114 includes N number of switches 304 each connected to two of the outputs 302 from the gain circuit 116. For instance, each switch 304 is implemented using a set of one or more transistors, such as metal-oxide semiconductor field effect transistors. For the embodiment illustrated, each of the N outputs from the sampler 112 couples to a separate switch 304 of the switching circuit 114. These connections enable the digitized values received on a given output from the sampler 112 to control the switching of the switch 304 between one gain circuit output 302 to receive the high gain value and another gain circuit output 302 to receive the low gain value.

As shown, the summing circuit 118 is a passive summing circuit. This particular passive circuit is an averager circuit having a plurality of resistor networks 308 having a same resistance value coupled in parallel between the switching circuit 114 and the receiver 110 input. Each resistor network 308 can include one resistor or multiple resistors connected in series to give the desired resistance value. Moreover, in this embodiment, the plurality of N input values selected from the 2N gain circuit outputs 302 includes a plurality of N gain values, and the compensation signal is the summation signal provided at the output of the summing circuit 118. The compensation signal provided to the receiver 110 input is, thus, based on a combination of the plurality of N selected gain values. More particularly, the compensation signal is an average of the plurality of N selected gain values.

The illustrated embodiment of the summing circuit 118 is a passive digital-to-analog circuit that includes resistors which average gain values represented as voltages. However, in other embodiments, the summing circuit 118 includes N wires or lines to sum a plurality of N currents from the gain circuit to provide as a compensation signal to the receiver 110 input in lieu of resistive summing.

Figure 4:
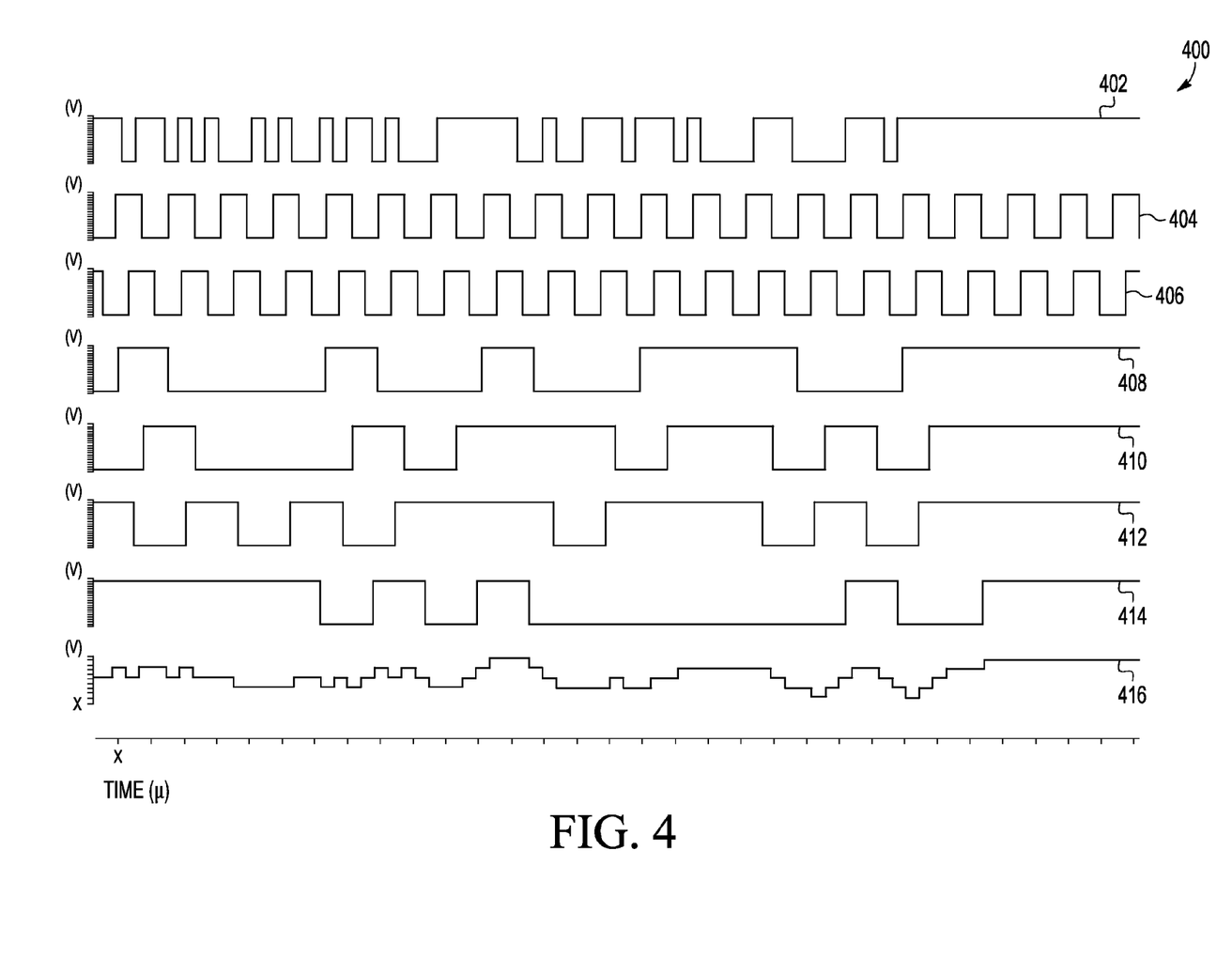
FIG. 4 illustrates a collection of timing diagrams associated with components of the system of FIG. 3.

FIG. 4 illustrates a collection 400 of timing diagrams 402, 404, 406, 408, 410, 412, 414, 416 that represent signals input, output, or operated on by elements of the system 300 of FIG. 3. In the timing diagrams, a voltage magnitude of the signal shown along the Y-axis is plotted over time shown along the X-axis. The timing diagram 402 represents the receiver 110 output signal, which the receiver 110 provides to the sampler 112. The timing diagrams 404 and 406 represent clock signals used by the sampler 112 to generate the N parallel sampled signals based on a 1-to-N de-multiplexing. In one example, the clock signals 404 and 406 are based off of a clock, such as a local phase-locked loop clock, a system clock, etc.

In this embodiment, the sampler 112 operates as a 1-to-4 multi-phase de-multiplexer. Accordingly, the sampler 112 generates four output signals represented by timing diagrams 408, 410, 412, 414, with each having different phases as relates to the clock signals 404 and 406. For each of the four output signals 408, 410, 412, 414, the bit or digitized value sampled from the receiver output is held for four bit counts and then the next bit for the output is sampled from signal 402. Accordingly, as the sampler 112 continuously samples the receiver 110 output signal, each bit (of the N bits) is separately provided by the sampler 112 and received by the switching circuit 114 at multiple phases, e.g., at different times.

As each bit is received, the switching circuit 114 correspondingly selects a high or low gain value corresponding to the received bit and provides the selected gain value to the summing circuit 118. As each new gain value is received, the summing circuit 118 averages the new gain value with the N−1 (in this case 3) previous gain values to generate a moving average of the plurality of input values. Correspondingly, the summation signal, and hence the compensation signal, is a moving average of the plurality input values to the summing circuit 118, where the moving average is determined as each new input value is received.

Accordingly, N digitized values provided at different phases by the sampler 112 are used by the switching circuit 114 to select the gain values, one at a time, which are used by the summing circuit 118 to generate the compensation signal. The compensation signal, which is a moving average of the selected gain values, contains low-frequency content that is combined with the filtered transmit signal to compensate for the loss of low-frequency content from the transmitted signal. In this manner, it can be said that sampler circuit 112 that provides the plurality of digitized values, the switching circuit 114, and the summing circuit 118 are configured to operate as a low pass filter for the compensation signal, which represents the low-frequency content that was undesirably removed from the input signal. A benefit of the compensation circuit 102 generating the filtered feedback signal as the multi-phase bits come into the summing circuit 118, instead of having to first wait for the capture of N bits in latch circuitry, is a more immediate response and hence less latency, than prior art compensation circuits.

Figure 5:
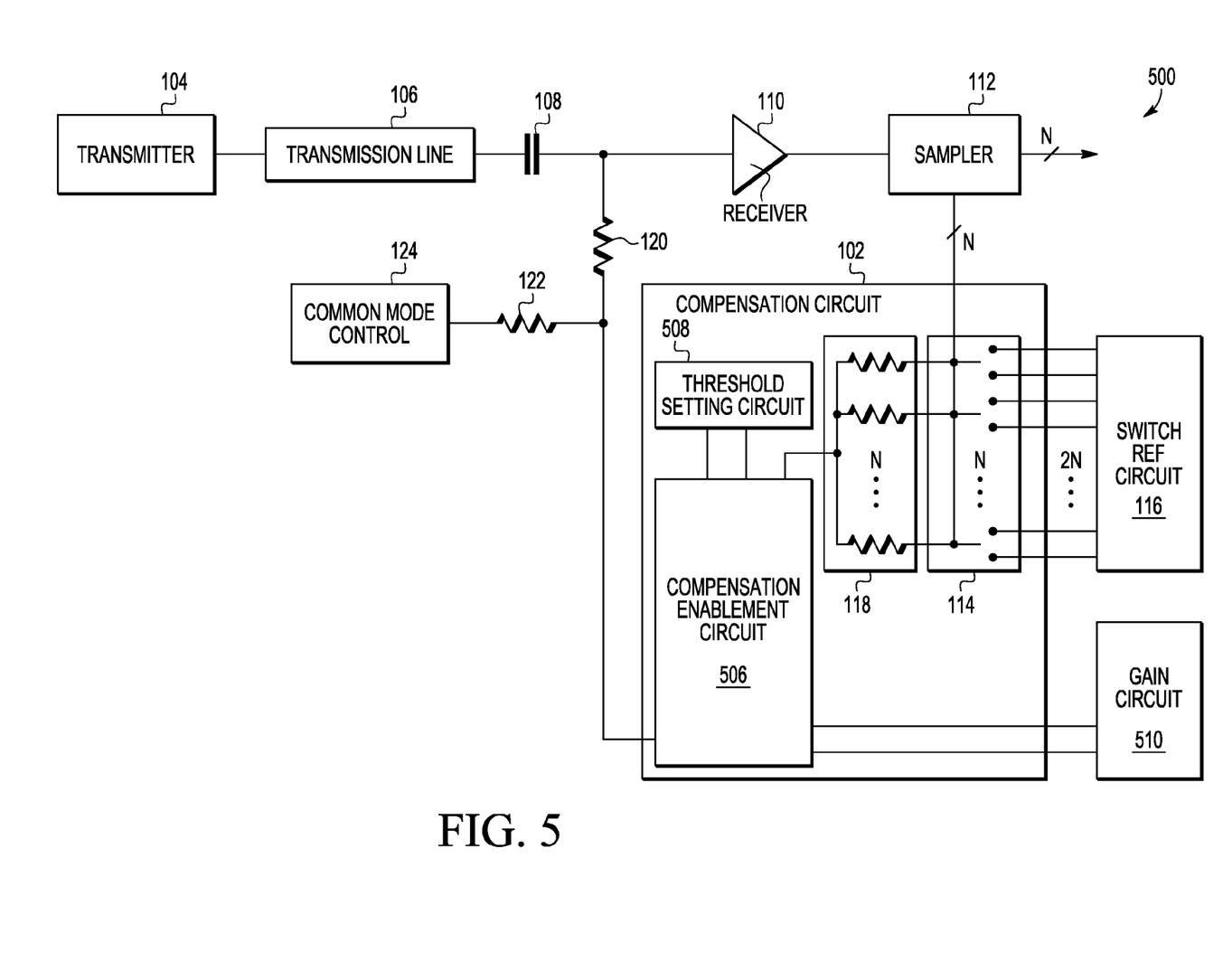
FIG. 5 illustrates another system having a compensation circuit for compensating for the loss of low-frequency signal content, in accordance with an embodiment.

FIG. 5 illustrates a system 500 having another example arrangement for the compensation circuit 102. The system 500 includes the transmitter 104, the transmission line 106, the capacitor 108, the receiver 110, the sampler 112, the common mode control 124 and the resistor networks 120 and 122 having a similar connectivity and operation as described by reference to FIGS. 1 and 2. The system 500 further includes the summing circuit 118, the switching circuit 114, and the reference value circuit 116 having a similar connectivity and operation as described by reference to FIGS. 3 and 4. However, the compensation circuit 102 of system 500 further includes a threshold setting circuit 508 and a compensation enablement circuit 506. Moreover, in the system 500, the reference value circuit 116 is implemented as a switch reference circuit, and a gain circuit 510 is also coupled to the compensation circuit 102.

More specifically, the output of the summing circuit 118 connects to the compensation enablement circuit 506. The threshold setting circuit 508 and the gain circuit 510 also connect to the compensation enablement circuit 506. The compensation enablement circuit 506 is coupled to the receiver 110 input to provide the compensation signal for baseline wander correction. The compensation enablement circuit 506 includes any suitable logic to make a determination whether or not to provide a compensation signal to the receiver 110 input. The threshold setting circuit 508 includes any suitable circuitry to set the thresholds for this determination, such as a passive circuit that includes multiple resistors is series with multiple outputs to provide different threshold voltage values.

In general, the threshold setting circuit 508 sets the thresholds, also referred to a threshold trip points, to which the summation signal from the summation circuit 118 is compared. Based on the results of that comparison, the compensation enablement circuit 506 either prevents a compensation signal from being provided to the receiver 110 input or selects one of multiple gain values provided at outputs of the gain circuit 510 and provides the selected gain value, to the receiver 110 input, as the compensation signal.

The switch reference circuit 116 can be set to provide reference values that allow a correct representation of the high and low-frequency content of the receiver 110 output signal to be presented, as the summation signal, to the compensation enablement circuit 506. In one example, each set of two outputs provides a high reference value and a low reference value. Accordingly, when the summation signal is compared to the thresholds provided by the threshold setting circuit 508, the compensation enablement circuit 506 disables the sending of the compensation signal when the summation signal represents high-frequency content. Alternatively, the compensation enablement circuit 506 selects the correct gain value depending on the low-frequency content that is represented by the summation signal.

Figure 6:
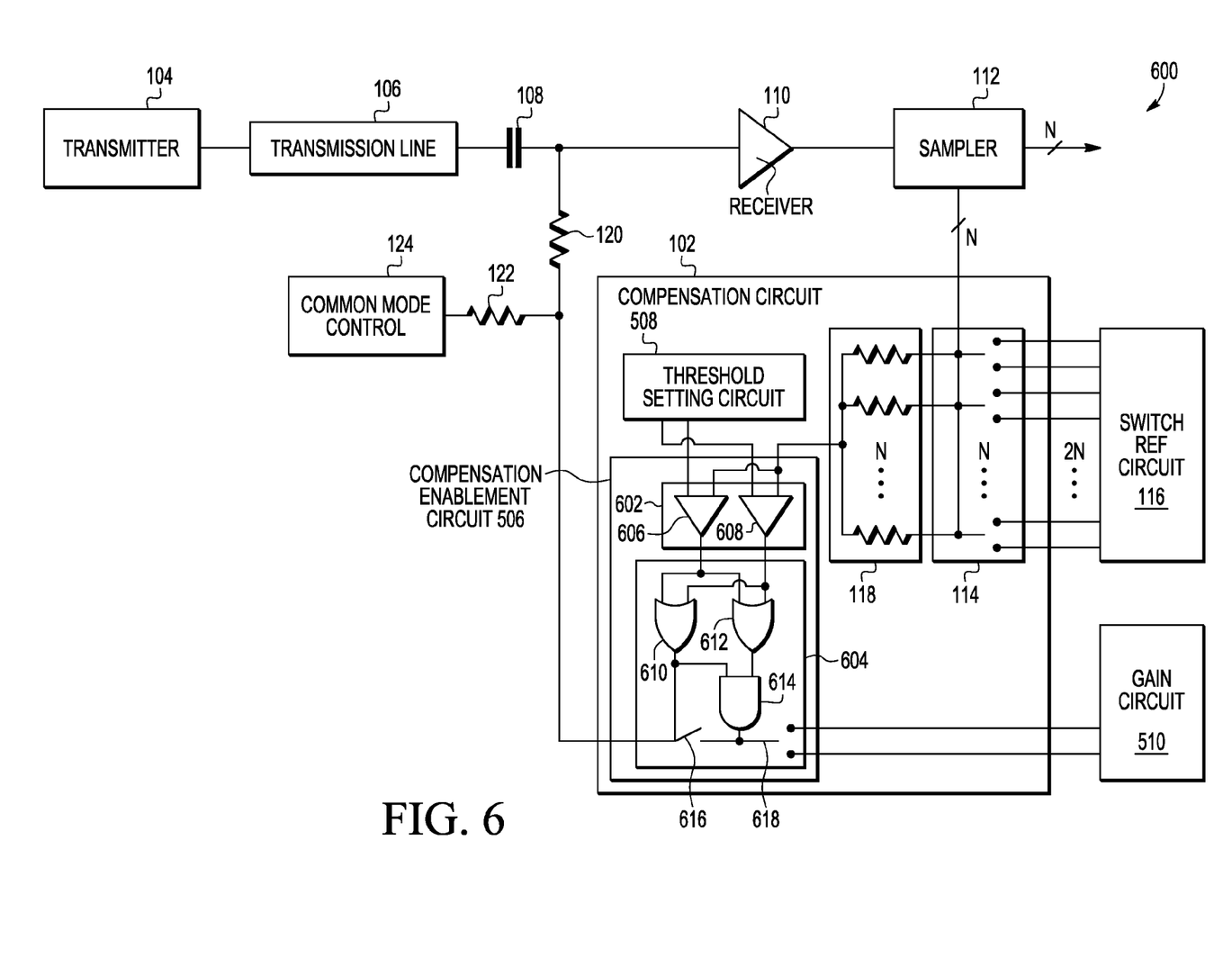
FIG. 6 illustrates an embodiment of a compensation enablement circuit for the system of FIG. 5.

FIG. 6 illustrates a system 600 that is similar to the system 500 of FIG. 5 except that an example implementation of the compensation enablement circuit 506 is further illustrated. The compensation enablement circuit 506 includes a gain selection circuit 604 and a comparison circuit 602 coupled between the summing circuit 118 and the gain selection circuit 604. The comparison circuit 602 includes a first comparator 606 and a second comparator 608 that are configured with different threshold trip points to use in adjusting, based on the summation signal, a control signal provided to the gain selection circuit 604. The gain selection circuit 604 includes an OR logic gate 610, an OR logic gate 612, an AND logic gate 614, and switches 616 and 618. The logic and switches in the gain selection circuit 604 can be implemented using transistor logic.

More particularly, both comparators 606 and 608 are connected at a first input to the output of the summing circuit 118 to receive the summation signal. A second input of the comparator 606 is connected to the threshold setting circuit 508 to receive a first threshold value, and a second input of the comparator 608 is connected to the threshold setting circuit to receive a second threshold value. The output of the comparator 606 is connected to first inputs of the logic gates 610 and 612. The output of the comparator 608 is connected to second inputs of the logic gates 610 and 612. Signals output from the comparators 606 and 608 are collectively referred to herein as a control signal. In general, a control signal is signaling (including one or more signals) generated by the compensation enablement circuit 506 that is used in determining whether or not to provide the compensation signal to the receiver 110 input.

For the embodiment illustrated, the components of the gain selection circuit 604 are connected as follows to use the control signal to determine whether or not to provide the compensation signal. The output of logic gate 610 is connected to the switch 616 and to a first input of the logic gate 614. The output of logic gate 612 is connected to a second input of the logic gate 614. The output of logic gate 614 is connected to the switches 616 and 618.

Switch 616 is coupled to the input of the receiver 110. Switch 618 is connected to first and second outputs of the gain circuit 510. In an embodiment, the first and second outputs of the gain circuit 510 provide high and low gain values, for instance in the form of voltages or currents. As connected and during operation of the system 600, the logic gate 610 outputs a signal to control the opening and closing of switch 616. The logic gate 614 outputs a signal to control the switching of switch 618 between the two outputs of the gain circuit 510. By controlling the switches 616 and 618, the output signals from the logic gates 610 and 614 control the allowance or disallowance of providing the compensation signal to the receiver 110 input.

Figure 7:
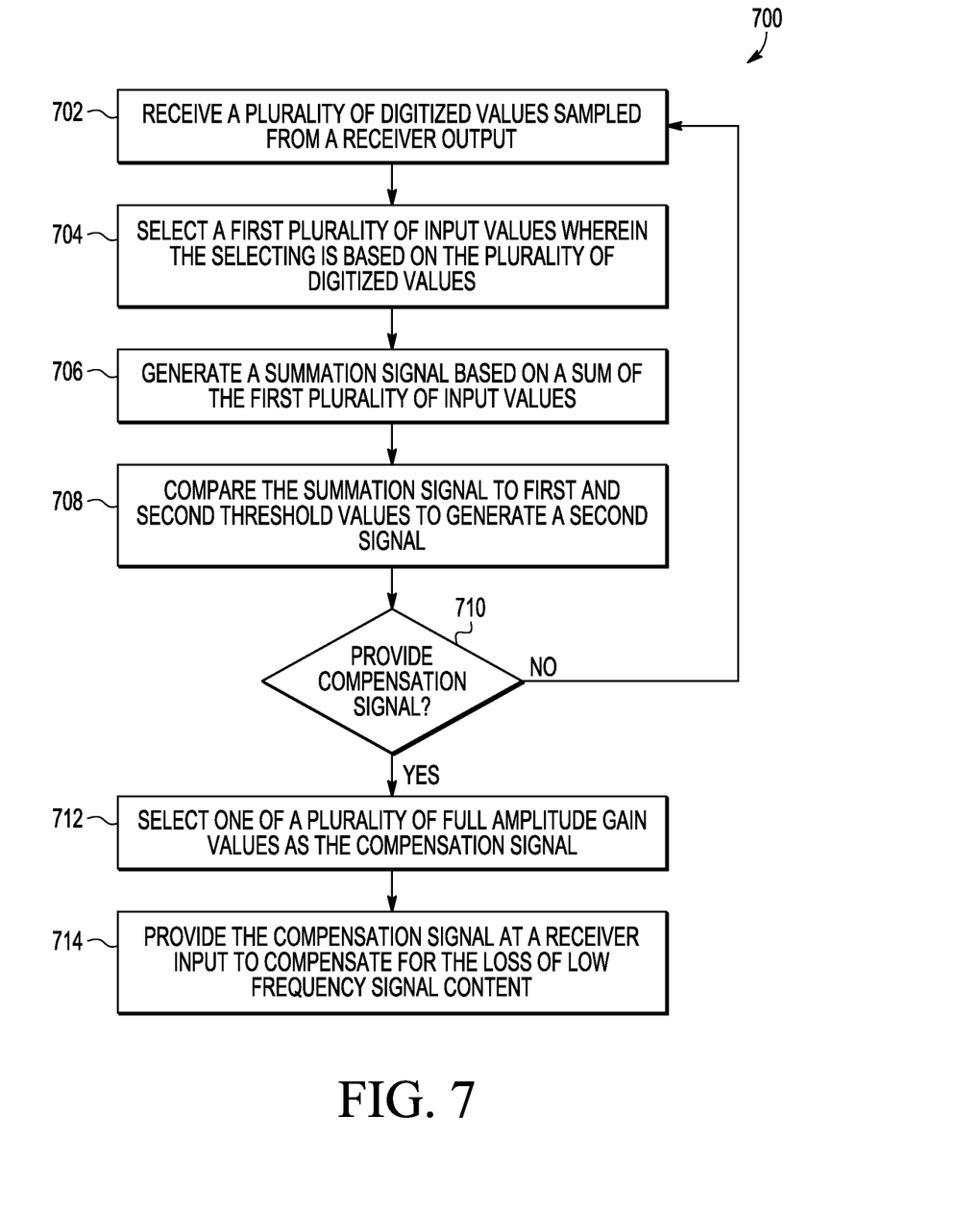
FIG. 7 illustrates a flow diagram for compensating for a loss of low-frequency signal content according to another embodiment.

A more detailed operation of the compensation circuit 102 of system 600 is described by reference to FIG. 7, which shows a flow diagram illustrating a method 700 for generating a compensation signal, and by reference to FIG. 8, which illustrates one example set 800 of timing diagrams that represent signals input, output, or operated on by elements of the system 600.

Particularly, method 700 at block 702 includes the switching circuit 114 receiving a first plurality of N digitized values sampled from a receiver output signal. For the example illustrated by FIG. 8, for the timing diagrams, a voltage magnitude of the signal shown along the Y-axis is plotted over time shown along the X-axis. The timing diagram 802 represents the receiver 110 output signal, which the receiver 110 provides to the sampler 112. The timing diagrams 804 and 806 represent clock signals used by the sampler 112 to generate the N parallel sampled signals based on a 1-to-N de-multiplexing, where N in this example is 4 but can be any suitable integer value. For this embodiment, the sampler 112 is a single phase sampler that transmits the plurality of digitized values, which are received by the switching circuit 114 at substantially the same time.

Figure 8:
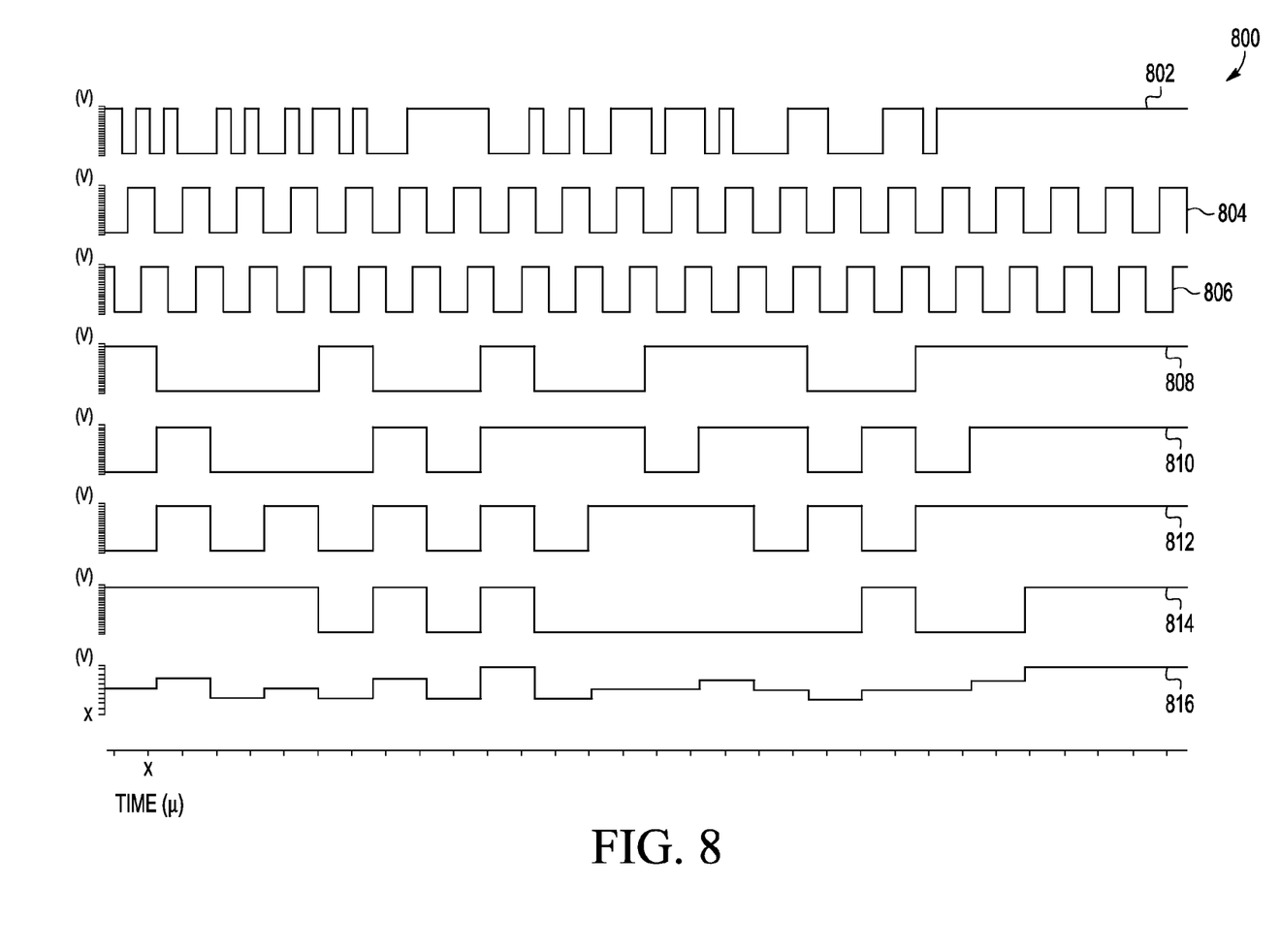
FIG. 8 illustrates a collection of timing diagrams associated with the components of FIG. 6.

Thus, as further shown in FIG. 8, the sampler 112 generates four output signals represented by timing diagrams 808, 810, 812, 814, with each having the same phase as relates to the clock signals 404 and 406. For each of the four output signals 808, 810, 812, 814, the bit or digitized value sampled from the receiver output is held for four bit counts and then the next bit for the output is sampled from signal 802. Accordingly, as the sampler 112 continuously samples the receiver 110 output signal, each of the N bits is provided by the sampler 112 and received by the switching circuit 114 during the same phases, e.g., at substantially the same time.

As the N bits are received, the switching circuit 114 correspondingly, at block 704, selects an input value, e.g., a high or low reference value, corresponding to the received bit and provides the selected reference values to the summing circuit 118. As each new set of four reference values is received, the summing circuit 118, at block 706, generates a summation signal based on a combination of the N input values. Particularly, the summing circuit 118 averages the N reference values and provides this average as the summation signal to the comparators 606 and 608. Signal 816 of FIG. 8 represents the summation signal. Because the sampler 112 in this example is a single phase sampler, the signal 816 is not as smooth as signal 416 of FIG. 4, where the sampler implemented was a multi-phase sampler. However, in an alternative embodiment of system 600, the sampler 112 is implemented as a multi-phase sampler.

The method 700 continues at block 708 with the comparators 606 and 608 comparing the summation signal to their respective threshold values to generate the control signal. For instance, the control signal includes signaling from the outputs of one or both of the comparators 606 and 608. The control signal is provided to the logic of the gain selection circuit 604 to determine, at block 710, whether or not to provide the compensation signal.

For a particular embodiment, the two threshold values are set such that there is a "dead zone" range of values between the two threshold values. Accordingly, when the summation signal falls within the dead zone, the control signal controls the logic of the gate selection circuit 604 such that switch 616 remains open. This disables the connection to the gain circuit 510, which prevents the compensation signal from being provided to the input of the receiver 110. The method 700 then returns to block 702 where the switching circuit 114 receives another four bits.

Alternatively, where the summation signal "meets" the threshold value of one of the comparators 606 or 608, the control signal controls the logic of the gate selection circuit 604 to close the switch 616 to enable the connection between the gain circuit 510 and the receiver 110 input. The control signal further controls the switch 618 to, at block 712, select one of the outputs of the gain circuit 510 to, thereby, select one of a plurality of, in this case one of two, full amplitude gain values as the compensation signal. A full amplitude gain value is simply a gain value that is passed without being modified by the compensation circuit 102.

For example, where the summation signal exceeds the threshold value of one of the comparators, the logic is controlled to select a high gain value. Alternatively, where the summation signal falls below the threshold value of the other comparator, the logic is controlled to select a low gain value. The compensation circuit 102, at block 714, provides at the receiver 110 input the selected gain value as the compensation signal to compensate for the loss of low-frequency signal content of the input signal.

Described herein are compensation circuits configured to compensate for a loss of low-frequency signal content of an input signal at a receiver input. Each compensation circuit includes a switching circuit and a summing circuit coupled to the switching circuit. The switching circuit is configured to receive a first plurality of digitized values sampled from a receiver output signal. The summing circuit is configured to generate a summation signal based on a combination of a first plurality of input values selected by the switching circuit. The selecting is based on the first plurality of digitized values. The compensation circuit is configured to provide to the receiver input a compensation signal to compensate for the loss of the low-frequency signal content from the input signal. The compensation signal is based on the summation signal and is a function of at least one gain value.

For a particular embodiment, the summing circuit is coupled through the switching circuit to a gain circuit that is configured to provide multiple gain values. The switching circuit is configured to select a portion of the multiple gain values as the first plurality of input values to provide to the summing circuit to generate the summation signal. The summing circuit is configured to generate the summation signal as the compensation signal based on a combination of the selected portion of the multiple gain values.

For another embodiment, the compensation circuit also includes a compensation enablement circuit coupled between the summing circuit and the receiver input. The compensation enablement circuit is configured to control, based on the summation signal, whether or not to provide the compensation signal to the receiver input. For example, the compensation enablement circuit includes a comparison circuit coupled to the summing circuit and a gain selection circuit coupled to the comparison circuit. The comparison circuit is configured to receive the summation signal to use in generating a control signal. The gain selection circuit is configured to receive the control signal to use in enabling or disabling a connection for providing the compensation signal or selecting one of a plurality of full amplitude gain values to provide as the compensation signal to the receiver input.

In accordance with a further embodiment is a method for compensating for a loss of low-frequency signal content of an input signal at a receiver input. The method includes receiving a first plurality of digitized values sampled from a receiver output signal, and selecting a first plurality of input values. The selecting is based on the first plurality of digitized values. The method also includes generating a summation signal based on a combination of the first plurality of input values and generating a compensation signal to provide at the receiver input to compensation for the loss of the low-frequency signal content from the input signal. The compensation signal is based on the summation signal and is a function of at least one gain value.

For a first implementation, the plurality of input values includes a plurality of gain values; and the compensation signal is the summation signal, which is based on a combination of the plurality of gain values. In a second implementation, generating the compensation signal includes: comparing the summation signal to at least one threshold value to generate a control signal; and determining, based on the control signal, whether or not to provide the compensation signal to the receiver input. For example, comparing the summation signal to the at least one threshold value to generate the control signal includes comparing the summation signal to a first threshold value set for a first comparator and comparing the summation signal to a second threshold value set for a second comparator. Additionally, for the second implementation, generating the compensation signal further includes selecting, based on the control signal, one of a plurality of full amplitude gain values as the compensation signal, when it is determined to provide the compensation signal to the receiver input.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendment made during the pendency of this application and all equivalents of those claims as issued.

For the sake of brevity, well known elements such as transmitters, receivers, common mode control, samplers, switch reference circuits, gain circuits and other functional aspects of the system may not be described in detail. Furthermore, the connecting lines shown in the various figures contained herein are intended to represent example functional relationships and/or physical couplings between the various elements. It should be noted that many alternative or additional functional relationships or physical connections may be present in a practical embodiment.

As used herein, the term "configured to", "configured with", "arranged to", "arranged with", "capable of" and any like or similar terms means that referenced circuit elements have an internal physical arrangement such as by virtue of physical coupling and/or connectivity with other circuit elements in an inactive state. This physical arrangement and/or physical coupling and/or connectivity while in the inactive state enables the circuit elements to perform stated functionality while in the active state of receiving and processing various signals at inputs of the circuit elements to generate signals at the output of the circuit elements. A device or structure that is "configured" in a certain way is configured in at least that way, but may also be configured in ways that are not described. Furthermore, in this document, relational terms such as first and second, top and bottom, and the like may be used solely to distinguish one entity or action from another entity or action without necessarily requiring or implying any actual such relationship or order between such entities or actions.

In addition, in the foregoing Detailed Description, it can be seen that various features are grouped together in various embodiments for the purpose of streamlining the disclosure.

This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A compensation circuit configured to compensate for a loss of low-frequency signal content of an input signal at a receiver input, the compensation circuit comprising:
  a switching circuit configured to receive a first plurality of digitized values sampled from a receiver output signal;
  a summing circuit coupled to the switching circuit, wherein the summing circuit comprises an averager circuit configured to generate a summation signal based on an average of a first plurality of input values selected by the switching circuit, wherein the selecting is based on the first plurality of digitized values;
  wherein the compensation circuit is configured to provide to the receiver input a compensation signal to compensate for the loss of the low-frequency signal content from the input signal, wherein the compensation signal is based on the summation signal and is a function of at least one gain value.

2. The compensation circuit of claim 1, wherein the averager circuit comprises a passive summing circuit.

3. The compensation circuit of claim 2, wherein the passive summing circuit comprises a plurality of resistor networks coupled in parallel between the switching circuit and the receiver input.

4. The compensation circuit of claim 1, wherein a number of connections into the summing circuit for receiving the plurality of input values is the same as the number of digitized values in the plurality of digitized values.

5. The compensation circuit of claim 1:
  wherein the summing circuit is coupled through the switching circuit to a gain circuit that is configured to provide multiple gain values, wherein the switching circuit is configured to select a portion of the multiple gain values as the first plurality of input values to provide to the summing circuit to generate the summation signal;
  wherein the summing circuit is configured to generate the summation signal as the compensation signal based on a combination of the selected portion of the multiple gain values.

6. The compensation circuit of claim 1 further comprising a compensation enablement circuit coupled between the summing circuit and the receiver input, wherein the compensation enablement circuit is configured to control, based on the summation signal, whether or not to provide the compensation signal to the receiver input.

7. The compensation circuit of claim 6, wherein the compensation enablement circuit comprises:
  a comparison circuit coupled to the summing circuit, wherein the comparison circuit is configured to receive the summation signal to use in generating a control signal; and
  a gain selection circuit coupled to the comparison circuit, wherein the gain selection circuit is configured to receive the control signal to use in:
    enabling or disabling a connection for providing the compensation signal;
    selecting one of a plurality of full amplitude gain values to provide as the compensation signal to the receiver input.

8. The compensation circuit of claim 7, wherein the comparison circuit comprises a first comparator and a second comparator coupled between the summing circuit and the gain selection circuit, wherein the first and second comparators are configured with different threshold trip points to use in adjusting the control signal based on the summation signal.

9. The compensation circuit of claim 1, wherein the switching circuit is coupled to a sampler circuit that is configured to provide the first plurality of digitized values at multiple phases.

10. The compensation circuit of claim 1 further comprising a filter coupled to the receiver input, wherein the filter is configured to operate as a high pass filter for the input signal and is configured to operate as a low pass filter for the compensation signal.

11. The compensation circuit of claim 1, wherein a sampler circuit that provides the plurality of digitized values, the switching circuit, and the summing circuit are configured to operate as a low pass filter for the compensation signal.

12. A method for compensating for a loss of low-frequency signal content of an input signal at a receiver input, the method comprising:
  receiving a first plurality of digitized values sampled from a receiver output signal;
  selecting a first plurality of input values, wherein the selecting is based on the first plurality of digitized values;
  generating a summation signal based on an average of the first plurality of input values;
  generating a compensation signal to provide at the receiver input to compensate for the loss of the low-frequency signal content from the input signal, wherein the compensation signal is based on the summation signal and is a function of at least one gain value.

13. The method of claim 12, wherein the first plurality of digitized values is received at multiple phases, and the summation signal comprises a moving average of the plurality of input values determined as each input value is received.

14. The method of claim 13, wherein the input signal is characterized by a first frequency, f1, and wherein the selecting of the first plurality of input values is characterized by a second frequency of f1/N, where N is a number of digitized values in the plurality of received digitized values.

15. The method of claim 12, wherein the plurality of input values comprises a plurality of gain values, and wherein the compensation signal is the summation signal, which is based on an average of the plurality of gain values.

16. The method of claim 12 further comprising filtering the compensation signal using a filter that is also used to filter the input signal.

17. The method of claim 12, wherein generating the compensation signal comprises:
  comparing the summation signal to at least one threshold value to generate a control signal;
  determining, based on the control signal, whether or not to provide the compensation signal to the receiver input.

18. The method of claim 17, wherein generating the compensation signal further comprises selecting, based on the control signal, one of a plurality of full amplitude gain values as the compensation signal, when it is determined to provide the compensation signal to the receiver input.

19. The method of claim 17, wherein comparing the summation signal to the at least one threshold value to generate the control signal comprises comparing the summation signal to a first threshold value set for a first comparator and comparing the summation signal to a second threshold value set for a second comparator.

\* \* \* \* \*